(12) United States Patent
Hassan et al.

(10) Patent No.: US 9,108,148 B2
(45) Date of Patent: Aug. 18, 2015

(54) APPARATUS AND METHOD FOR GAS SEPARATION

(71) Applicant: H R D Corporation, Houston, TX (US)

(72) Inventors: Abbas Hassan, Sugar Land, TX (US); Rayford G. Anthony, College Station, TX (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

(21) Appl. No.: 13/678,409

(22) Filed: Nov. 15, 2012

(65) Prior Publication Data

US 2013/0167722 A1    Jul. 4, 2013

Related U.S. Application Data

(63) Continuation of application No. 13/568,888, filed on Aug. 7, 2012, which is a continuation of application No. 12/708,862, filed on Feb. 19, 2010, now Pat. No. 8,277,540.

(60) Provisional application No. 61/154,189, filed on Feb. 20, 2009.

(51) Int. Cl.
*B01D 53/24* (2006.01)
*B01D 53/22* (2006.01)
(Continued)

(52) U.S. Cl.
CPC ............ *B01D 53/24* (2013.01); *B01D 45/14* (2013.01); *B01D 53/22* (2013.01); *B01D 59/20* (2013.01); *B01D 63/06* (2013.01); *B04B 5/08* (2013.01); *B04B 7/08* (2013.01); *B01D 2256/24* (2013.01);
(Continued)

(58) Field of Classification Search
USPC ........... 55/406, 407, 408, 409, 447, 448, 449, 55/450, 458, 523, 525, 526; 95/1, 8, 19, 95/22, 23, 26, 34, 35, 45, 269, 270, 277, 95/284; 96/4, 10, 124, 125, 177, 178, 179, 96/188, 195, 196, 216, 217
See application file for complete search history.

(56) References Cited

U.S. PATENT DOCUMENTS 2,422,882 A    6/1947   Bramley
2,536,423 A *  1/1951   Cohen et al. .................... 494/65
(Continued)

FOREIGN PATENT DOCUMENTS

CA    1015722    *  8/1977
DE    4435642       4/1995
(Continued)

OTHER PUBLICATIONS

IKA-Rotor-Stator Generators—2003 Processing Ctalog (38 pgs.).
(Continued)

*Primary Examiner* — Duane Smith
*Assistant Examiner* — Sonji Turner
(74) *Attorney, Agent, or Firm* — Timothy S. Westby; Porter Hedges LLP

(57) ABSTRACT

Herein disclosed is an apparatus that includes a porous rotor positioned about an axis of rotation and surrounding an interior space, wherein the porous rotor includes sintered metal or ceramic; an outer casing, wherein the outer casing and the porous rotor are separated by an annular space; and a motor configured for rotating the porous rotor about the axis of rotation.

15 Claims, 1 Drawing Sheet

(51) Int. Cl.

| | |
|---|---|
| *B01D 59/20* | (2006.01) |
| *B01D 63/06* | (2006.01) |
| *B04B 5/08* | (2006.01) |
| *B04B 7/08* | (2006.01) |
| *B01D 45/14* | (2006.01) |

(52) U.S. Cl.
CPC ..... *B01D 2257/102* (2013.01); *B01D 2257/504* (2013.01); *B01D 2313/18* (2013.01); *Y02C 10/10* (2013.01)

(56) References Cited

U.S. PATENT DOCUMENTS

| | | | |
|---|---|---|---|
| 2,652,520 A | | 9/1953 | Studders |
| 2,709,500 A | * | 5/1955 | Carter ............................... 55/408 |
| 2,876,949 A | * | 3/1959 | Skarstrom ........................ 494/14 |
| 2,947,472 A | * | 8/1960 | Skarstrom et al. .............. 494/42 |
| 3,108,955 A | * | 10/1963 | Boyland .......................... 494/74 |
| 3,251,542 A | * | 5/1966 | Newgard et al. ................ 494/37 |
| 3,289,925 A | * | 12/1966 | Zippe et al. ..................... 494/15 |
| 3,501,091 A | | 3/1970 | Yoshitoshi et al. |
| 3,613,989 A | | 10/1971 | Oyama et al. |
| 3,669,879 A | | 6/1972 | Berriman |
| 3,774,376 A | * | 11/1973 | Takashima et al. ............. 55/407 |
| 3,797,737 A | * | 3/1974 | Kadotani et al. ................ 494/81 |
| 3,879,286 A | | 4/1975 | Berriman |
| 3,887,167 A | | 6/1975 | Irwin |
| 3,915,673 A | | 10/1975 | Tamai et al. |
| 3,946,942 A | * | 3/1976 | Theurich ......................... 494/37 |
| 3,955,757 A | * | 5/1976 | Lowry ............................. 494/14 |
| 3,998,610 A | * | 12/1976 | Leith ............................... 95/35 |
| 4,015,958 A | * | 4/1977 | Leschonski et al. ............ 96/301 |
| 4,373,941 A | * | 2/1983 | Lagelbauer ..................... 55/401 |
| 4,382,900 A | * | 5/1983 | Wem ............................... 261/89 |
| 4,400,275 A | | 8/1983 | Ramshaw et al. |
| 4,516,966 A | | 5/1985 | Alderton et al. |
| 4,627,890 A | * | 12/1986 | Porter et al. .................... 202/235 |
| 4,687,585 A | * | 8/1987 | Ramshaw ....................... 210/787 |
| 4,692,283 A | * | 9/1987 | Wem et al. ...................... 261/89 |
| 4,715,869 A | * | 12/1987 | Ramshaw ....................... 95/263 |
| 5,538,191 A | | 7/1996 | Holl |
| 5,877,350 A | | 3/1999 | Langer et al. |
| 5,925,156 A | * | 7/1999 | Motoki et al. .................. 55/487 |
| 5,993,502 A | * | 11/1999 | Motoki et al. .................. 55/487 |
| 6,048,513 A | * | 4/2000 | Quarderer et al. ............. 423/473 |
| 6,368,366 B1 | | 4/2002 | Langer et al. |
| 6,368,367 B1 | | 4/2002 | Langer et al. |
| 6,383,237 B1 | | 5/2002 | Langer et al. |
| 6,530,964 B2 | | 3/2003 | Langer et al. |
| 6,742,774 B2 | | 6/2004 | Holl |
| 6,752,529 B2 | | 6/2004 | Holl |
| 7,165,881 B2 | | 1/2007 | Holl |
| 7,538,237 B2 | | 5/2009 | Holl |
| 7,575,728 B2 | | 8/2009 | Holl |
| 8,277,540 B2 | | 10/2012 | Hassan et al. |
| 2006/0230933 A1 | | 10/2006 | Harazim et al. |
| 2007/0006559 A1 | | 1/2007 | Raussi et al. |
| 2009/0068090 A1 | * | 3/2009 | Cherry ........................... 423/658.2 |
| 2009/0139921 A1 | * | 6/2009 | Bartosek et al. ............... 210/137 |
| 2009/0272265 A1 | | 11/2009 | Mashimo et al. |
| 2009/0301296 A1 | | 12/2009 | Hoijtink et al. |
| 2010/0018392 A1 | | 1/2010 | Schroeder |

FOREIGN PATENT DOCUMENTS

| | | | |
|---|---|---|---|
| EP | 0328223 | | 8/1989 |
| EP | 0388181 | | 9/1990 |
| EP | 2011560 | | 1/2009 |
| GB | 1425311 A | * | 2/1976 |
| JP | 2006297298 | | 11/2006 |
| JP | 2009018269 | | 1/2009 |
| KR | 100675919 | | 1/2007 |
| WO | 02064708 A2 | | 8/2002 |
| WO | 2008054548 | | 5/2008 |
| WO | 2008054548 A2 | | 5/2008 |

OTHER PUBLICATIONS

Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
Chinese Publication Notice dated May 4, 2012 for corresponding Chinese Application No. 201080017047.9 (15 pgs.).
Japanese Published Application dated Aug. 16, 2012 for corresponding Japanese Application No. 2012518533 (17 pgs.).
European Search Report dated Sep. 14, 2012 for corresponding European Application No. 10744351.7 (6 pgs.).
International Search Report and Written Opinion dated Sep. 27, 2010 for corresponding International Application No. PCT/US2010/024721 (7 pgs.).
Canadian Office Action dated Feb. 1, 2013 for for corresponding Canadian Application No. 2,753,185 (3 pgs.).
Notice of Allowance dated Mar. 6, 2013 for corresponding U.S. Appl. No. 13/568,888 (8 pgs.).
Chinese Office Action dated Jul. 19, 2013 for corresponding Chinese Application No. 201080017047.9 (8 pgs.).
Office Action dated Jun. 21, 2013 for corresponding U.S. Appl. No. 13/568,888 (11 pgs.).
Chinese Office Action dated May 5, 2014 for corresponding Chinese Application No. 201080017047.9 (6 pgs.).
Japanese Office Action dated Feb. 18, 2014 for corresponding Japanese Application No. 2011-551247 (6 pgs.).
Notice of Allowance dated Mar. 25, 2014 for corresponding U.S. Appl. No. 13/568,888 (12 pgs.).
Office Action dated Nov. 13, 2013 for corresponding U.S. Appl. No. 13/568,888 (14 pgs.).

(56) References Cited

OTHER PUBLICATIONS

Canadian Office Action dated Oct. 28, 2013 for corresponding Canadian Application No. 2,753,185 (2 pgs.).

Chinese Office Action dated Sep. 22, 2014 for corresponding Chinese Application No. 201080017047.9 (14 pgs.).

European Examination Report dated Dec. 3, 2014 for corresponding European Application No. 10744351.7-1356 (4 pgs.).

* cited by examiner

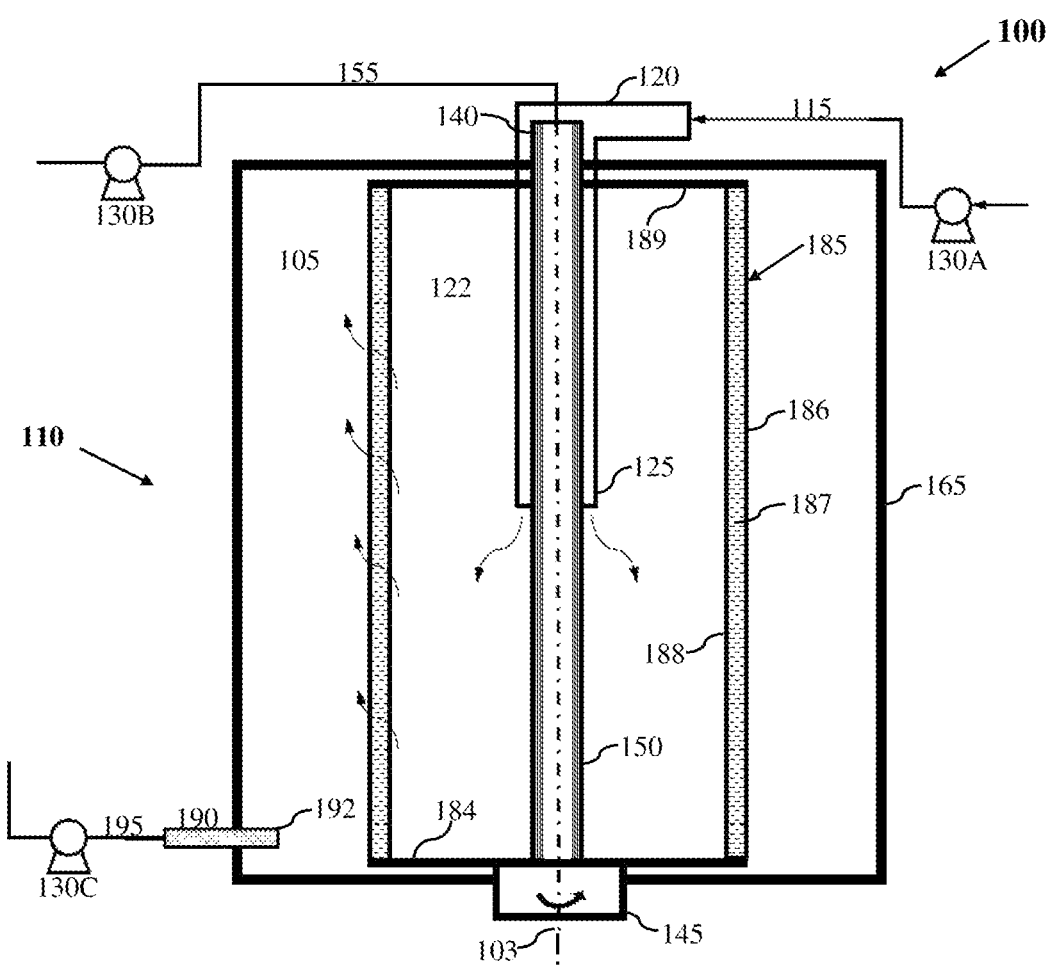

APPARATUS AND METHOD FOR GAS SEPARATION

CROSS-REFERENCE TO RELATED APPLICATIONS

This application is a continuation application of U.S. patent application Ser. No. 13/568,888, filed Aug. 7, 2012, which is a continuation application of U.S. patent application Ser. No. 12/708,862, filed Feb. 19, 2010 (now U.S. Pat. No. 8,277,540), which application claims the benefit under 35 U.S.C. §119(e) of U.S. Provisional Patent Application Ser. No. 61/154,189 filed Feb. 20, 2009. The disclosure of each application is hereby incorporated herein by reference in entirety for all purposes.

STATEMENT REGARDING FEDERALLY SPONSORED RESEARCH OR DEVELOPMENT

Not Applicable.

BACKGROUND OF THE INVENTION

1. Technical Field

The present invention generally relates to the separation of gases. More specifically, the present invention relates to separation of light and heavy components of a feed gas via centrifugation. Even more specifically, in embodiments, the present invention relates to gas separation via centrifugation utilizing a porous rotor.

2. Background of the Invention

Separation of gases, especially gases having similar molecular weights, is a challenging task. Isotope separation is a particularly difficult and energy intensive activity. For example, separating uranium into naturally-occurring uranium-238 from uranium-235. Around 99.284% of naturally-occurring uranium is uranium-238, while about 0.711% is uranium-235, and about 0.0058% is uranium-234. Enriching uranium is difficult because the two isotopes have very nearly identical chemical properties, and are very similar in weight: uranium-235 is only 1.26% lighter than uranium-238. Separation methods, including diffusion techniques and centrifugation, that exploit the slight differences in atomic weights of isotopes have been employed to separate isotopes of uranium and produce depleted uranium consisting mainly of the 238 isotope, and enriched uranium having a higher-than-natural quantity of the uranium-235 isotope.

Diffusion techniques are used to separate similar-molecular weight gases. Gaseous diffusion is a technology used to produce enriched uranium by forcing gaseous uranium hexafluoride through semi-permeable membranes, typically silver-zinc membranes, and separating the different isotopes by difference in diffusion rates. This produces a slight separation between the molecules containing uranium-235 and uranium-238, as uranium-238 is heavier and thus diffuses a bit more slowly than uranium-235. Thermal diffusion applies the transfer of heat across a thin liquid or gas to accomplish isotope separation. The process exploits the fact that the lighter uranium-235 gas molecules will diffuse toward a hot surface, and heavier uranium-238 gas molecules will diffuse toward a cold surface.

Centrifugation is also known for the separation of gases of similar molecular weight. A gas centrifuge is a separating machine specifically developed to separate uranium-235 from uranium-238 by applying forces to the gas mixture by placing material inside a mechanism that rotates the material at high speed. The gas centrifugation process uses a large number of rotating cylinders in series and parallel formations. The rotation of each cylinder creates a strong reactive centrifugal force accelerating molecules based upon mass and causing heavier gas molecules containing uranium-238 to move toward the outside of the cylinder and the lighter gas molecules rich in uranium-235 to collect closer to the center. Gas centrifugation requires much less energy to achieve similar separation to older gaseous diffusion processes, and thus gas centrifugation has largely replaced gaseous diffusion as an enrichment method. The Zippe centrifuge is an enhancement on the standard gas centrifuge, the primary difference being the use of heat. The bottom of the rotating cylinder is heated, producing convection currents that move the uranium-235 up the cylinder, where it can be collected.

A feature common to all large-scale enrichment schemes is that they employ a number of identical stages to produce successively higher concentrations of uranium-235. Each stage concentrates the product of the previous step further before being sent to the next stage. Similarly, the tailings from each stage are returned to the previous stage for further processing. This sequential enriching system is called a cascade. For example, gas centrifugation is performed with multiple centrifugal runs using cascades of centrifuges.

Another expensive gas separation, for example, is separation of undesired components from methane obtained downhole. Removal of carbon dioxide and other components from the methane to provide a pipeline-grade methane generally involves the use of very low temperatures and/or amine units. Such units can be costly and their operation time-consuming.

Accordingly, in view of the art, there is a need for efficient and economical apparatus and methods of separating gases. Desirably, the separation is performed in the absence of a large cascade of separation stages and/or in the absence of cooling.

SUMMARY

Herein disclosed is an apparatus comprising (1) a porous rotor symmetrically positioned about an axis of rotation and surrounding an interior space; (2) an outer casing, wherein the outer casing and the rotor are separated by an annular space; (3) a motor configured for rotating the rotor about the axis of rotation; (4) a feed inlet positioned along the axis of rotation and fluidly connected with the interior space; and (5) a first outlet, wherein the first outlet is fluidly connected with the interior space. In embodiments, the feed inlet of the apparatus extends into the interior space.

Embodiments disclosed herein pertain to an apparatus that may include a porous rotor positioned about an axis of rotation and surrounding an interior space, wherein the porous rotor comprises sintered metal or ceramic; an outer casing, wherein the outer casing and the porous rotor are separated by an annular space; and a motor configured for rotating the porous rotor about the axis of rotation.

In aspects, the porous rotor may be substantially tubular. The porous rotor may be selectively-permeable. The apparatus may include a feed inlet positioned along the axis of rotation and fluidly connected with the interior space; and a first outlet, wherein the first outlet is fluidly connected with the interior space. The apparatus may include a second outlet, wherein the second outlet is fluidly connected with the annular space. The feed inlet may extend into the interior space. The porous rotor may have a diameter in the range of from about 4 to about 12 inches. The porous rotor may have a length in the range of from about 8 to about 20 inches. The motor may be capable of providing a rotational frequency of the porous rotor of up to at least about 7,500 RPM.

Other embodiments of the disclosure pertain to an apparatus that may include a porous rotor symmetrically positioned about an axis of rotation and surrounding an interior space; an outer casing, wherein the outer casing and the rotor are separated by an annular space; a motor configured for rotating the rotor about the axis of rotation; a feed inlet positioned along the axis of rotation and fluidly connected with the interior space; and a first outlet, wherein the first outlet is fluidly connected with the interior space.

The feed inlet may extend into the interior space. The rotor may be substantially tubular. The porous rotor may be made from or comprise a selectively-permeable metal or ceramic material. The porous rotor may have a diameter in the range of from about 4 to about 12 inches. The porous rotor may have a length in the range of from about 8 to about 20 inches. The motor may be configured to operate with a rotational frequency of the porous rotor of up to at least about 7,500 RPM. The apparatus may include a second outlet. The second outlet may be fluidly connected with the annular space.

Yet other embodiments of the disclosure pertain to an apparatus that may include a substantially tubular porous rotor positioned about an axis of rotation and surrounding an interior space, wherein the porous rotor comprises sintered metal or ceramic, and wherein the porous rotor is selectively-permeable; an outer casing, wherein the outer casing and the porous rotor are separated by an annular space; and a motor configured for rotating the porous rotor about the axis of rotation.

In aspects, the apparatus may include a feed inlet positioned along the axis of rotation and fluidly connected with the interior space; and a first outlet, wherein the first outlet is fluidly connected with the interior space. In other aspects, the apparatus may include a second outlet, wherein the second outlet is fluidly connected with the annular space, and wherein the feed inlet extends into the interior space. The porous rotor may have a diameter in the range of from about 4 to about 12 inches. The porous rotor may have a length in the range of from about 8 to about 20 inches.

In embodiments, the rotor of the apparatus is substantially tubular. In embodiments, the porous rotor of the apparatus is made from or comprises a selectively-permeable material. In certain embodiments, selectively-permeable material comprises sintered metal or ceramic. In some embodiments, the porous rotor of the apparatus has a diameter in the range of from about 4 to about 12 inches. In some embodiments, the porous rotor of the apparatus has a length in the range of from about 8 to about 20 inches. In certain embodiments, the motor of the apparatus is capable of providing a rotational frequency of the porous rotor of up to at least about 7,500 RPM. In certain embodiments, the apparatus further comprises a second outlet, wherein the second outlet is fluidly connected with the annular space.

Another aspect of the present disclosure includes a system comprising at least one apparatus as described. In certain embodiments, the disclosed system further comprises at least one pump. In some embodiments, the system further comprises a feed inlet line in fluid communication with the feed inlet and a first outlet line fluidly connected with the first outlet, wherein the at least one pump is positioned on the feed inlet line or the first outlet line.

Herein disclosed is also a method of separating a feed gas into a first fraction and a second fraction, wherein the first fraction has an average molecular weight lower than the average molecular weight of the second fraction. The disclosed method comprises: (1) introducing the feed gas into an interior space within a rotor of a gas centrifuge, wherein the rotor is permeable to gas and symmetrically positioned about an axis of rotation; (2) rotating the rotor about the axis of rotation, whereby the heavy molecules of the feed gas are forced toward the rotor; and (3) extracting the first fraction from within the interior space proximal the axis of rotation, leaving the second fraction therein. In some embodiments, rotating the rotor about the axis of rotation provides a rotational frequency of at least 7,500 RPM.

In some embodiments, the method further comprises extracting the second fraction from the interior space. In some cases, extracting the second fraction from the interior space comprises passing the second fraction through the porous rotor and extracting the second fraction from the outside of the rotor. In certain embodiments, extracting the second fraction from the outside of the rotor further comprises assisting extraction of the first fraction via application of vacuum.

In certain embodiments, the porous rotor comprises sintered metal or ceramic. In some embodiments, extracting the first fraction from within the interior space proximal the axis of rotation comprises extracting the first fraction through a sintered metal tube. In certain embodiments, the sintered metal tube has an average pore size exclusive of particles above a cutpoint size. In certain other embodiments, extracting the first fraction through a sintered metal tube further comprises assisting extraction of the first fraction via application of vacuum to the interior space.

These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawing, wherein:

FIG. 1 is a schematic of a system according to an embodiment of this disclosure.

NOTATION AND NOMENCLATURE

As used herein, the use of the modifiers "light," and "heavy" when referring to components or fractions of a gas stream indicate relative weights, i.e. that the "light" component or fraction has a lower molecular weight than the "heavy" component or fraction.

As used herein, the use of the modifiers "large" and "small" when referring to components or fractions of a gas stream indicate relative molecular sizes, i.e. that the "large" component or fraction has a greater molecular size than the "small" component or fraction.

DETAILED DESCRIPTION

I. Overview. Herein disclosed are a system and method of separating a feed gas into a light weight fraction or component and a heavy weight fraction or component. The heavy weight fraction or component has a higher molecular weight than the light weight fraction or component.

Centrifugation relies on the effect of simulating gravity (using reactive centrifugal acceleration) to separate molecules according to their mass, and can be applied to both liquid and gaseous materials. Forces are applied by placing material inside a mechanism (i.e., a centrifuge) that rotates the material at high speed. The conventional gas centrifuge relies on the principles of reactive centrifugal force accelerating molecules based upon mass. As conventionally performed in a cascade of gas centrifuges in series and/or parallel, centrifugation yields separations of components having different molecular weights. According to this disclosure, centrifugation utilizing a sintered material (i.e., a porous rotor and/or a stationary sintered metal tube) allows effective separation by one or a few units, rather than requiring a cascade comprising a large number (up to thousands) of gas centrifuges.

The system and process are similar in theory to reverse osmosis, in which pressure is used to force a solution through a membrane, retaining the solute on one side and allowing the pure solvent to pass to the other side.

II. System for Gas Separation. The gas separation system of this disclosure comprises at least one gas centrifuge. The at least one gas centrifuge comprises at least one porous sintered metal rotor or tube. In embodiments, the system comprises at least one porous rotor. The system may further comprise one or more pumps. The gas separation system may further comprise one or more flow control valves. The system may be in electronic communication with a control system for monitoring and controlling flow into and out of the gas centrifuge.

A system for gas separation according to this disclosure will now be described with reference to FIG. 1. FIG. 1 is a schematic of a gas separation system 100 according to an embodiment of this disclosure. Gas separation system 100 comprises gas centrifuge 110, feed pump 130A, first outlet pump 130B, and second outlet pump 130C.

A system of this disclosure comprises at least one gas centrifuge 110. Each of the one or more gas centrifuges of the disclosed system comprises an outer casing, at least one porous component selected from a porous rotor or a porous outlet tube, at least one feed inlet, and at least two product outlets. In the embodiment of FIG. 1, gas centrifuge 110 comprises outer casing 165, porous rotor 185, feed inlet 120, first fraction outlet 140, and second product outlet 190.

Gas centrifuge 110 comprises outer casing 165. As indicated in FIG. 1, outer casing 165 surrounds rotor 185. Outer casing 165 may be cylindrical on its outer and/or inner surfaces. Outer casing 165 can be made out of specific materials to prevent harmful materials from hurting users of gas centrifuge 110. In applications, components of gas centrifuge 110, such as casing 165, are made of stainless steel.

Porous Rotor or Stationary Porous Tube. Each of the one or more gas centrifuges comprises at least one porous component. The porous component may be a porous rotor or a stationary porous tube. In embodiments, the gas separation system comprises a porous rotor. As indicated in the embodiment of FIG. 1, porous rotor 185 is symmetrically positioned within casing 165 about an axis of rotation 103. Porous rotor 185 is positioned within outer casing 165 such that a clearance or annular space 105 is created between outer wall 186 of porous rotor 185 and the inner surface of outer casing 165. Rotor 185 surrounds an interior space 122 configured such that the interior space 122 may be evacuated of air prior to use to provide near frictionless rotation when operating. Porous rotor 185 may comprise a selectively permeable or size-exclusion rotor. The rotor may be tubular in shape, e.g. a sintered metal tube. Porous rotor 185 is designed such that it is permeable to gaseous components of a desired size.

In applications, the system comprises a porous tube. For example, in embodiments, first outlet 140 is one end of a stationary porous tube 150. The walls of stationary porous tube 150 may comprise or contain therein size-exclusion or selectively-permeable material.

The porous component may comprise or contain sintered metal. In embodiments, a porous rotor is made of or contains a selectively permeable cylinder made of any material which can be tailored for the desired pore size and porosity and have the integral strength to withstand the rotation. Suitable porous material may be, for example, ceramic or stainless steel. In embodiments, the porous material comprises 316 stainless steel. In applications, the porosity (density) and average pore size of the porous material is tailored to allow passage of components less than a desired cutpoint size while excluding passage of components having a size greater than the cutpoint size.

The porous material may be sintered metal. In embodiments, the density of the sintered metal is in the range of from about 3 g/cm$^3$ to about 6 g/cm$^3$. In applications, the density of the sintered metal is greater than about 3 g/cm$^3$, 3.5 g/cm$^3$, 4 g/cm$^3$, 4.5 g/cm$^3$, 5 g/cm$^3$, or 6 g/cm$^3$. In applications, the density of the porous material is about 3.5 g/cm$^3$, 4 g/cm$^3$, 4.5 g/cm$^3$, 5 g/cm$^3$, or 5.5 g/cm$^3$. In embodiments, the average pore size of a selectively permeable porous material is less than about 200 µm, less than about 50 µm, less than about 20 µm, less than about 10 µm, less than about 5 µm, less than about 3 µm, less than about 1 µm, or less than about 0.5 µm. In embodiments, the average pore size is in the range of Angstroms.

In embodiments, the porous material is formed by placing metal powder, e.g. stainless steel powder, in a mold and pressing it under high pressure. In embodiments, pressures of greater than 20,000 psig are utilized to compress the powder and form the porous material. In embodiments, pressures of greater than 50,000 psig are utilized to compress the powder and form the porous material. In embodiments, pressures of up to 150,000 psig are utilized to compress the powder and form the porous material. Pressing may reduce the thickness of a starting powder by at least 60%. The pressed material may then be calcined in an oven. To avoid shrinkage during formation, the material may be brought to a temperature approaching, but less than, the melt temperature, and cool down may be controlled over a sufficient duration to avoid/minimize shrinkage. Control of temperature during formation of the porous material of the rotor may also hinder the formation of oxides.

The porous material of the rotor may be custom-tailored to provide gas flow paths of a desired tortuousity, porosity (density) and average pore size of the material. For example, a powder may be pressed into a honeycomb structure or wax added and subsequently calcined to remove the honeycomb or wax structure and leave honeycomb- or other patterned tailored paths or voids within the porous material of the rotor. In this manner, the porous rotor may be designed with a desired average pore size and/or flow path.

The porous rotor may have a diameter and length determined to be suitable for a certain application, and the gas centrifuge may have any desired nominal size. As such, the dimensions provided are not meant to be limiting. In applications, porous rotor 185 has a diameter in the range of from about 2 inches to about 12 inches, from about 4 inches to about 10 inches, from about 4 inches to about 8 inches, or from about 4 inches to about 6 inches. Porous rotor 185 may have a vertical length in the range of from about 8 inches to about 20 inches, from about 10 inches to about 17 inches, or from about 12 inches to about 15 inches. The nominal capacity of gas centrifuge 110 may be about 10 gallons, about 5 gallons, or about 1 gallon. The thickness of the sintered material of the rotor may be tailored to provide a desired surface area. In embodiments, rotor 185 comprises sintered material having a thickness of about ¼-inch, about ½-inch, about ¾-inch, or about 1-inch.

A desired permeability or average pore size of the porous component (e.g., a stationary metal outlet tube 150) may be obtained by providing a sintered material of a certain pore size (e.g., 30 to 100 µm) and subsequently treating the sintered material with molecular sieve or membrane. The external surfaces of the sintered metal material may be covered with one or more layers of molecular sieve. Suitable molecular sieves include, without limitation, carbon sieves, ALPOS, SAPOS, silicas, titanium silicates, and zeolites. In embodiments, the molecular sieve has a pore size in the range of from 3 angstrom (Å) to about 20 Å (about 0.3 nm to about 2 nm). The coating may be applied via methods similar to methods utilized to prepare catalyst surfaces on monolith and/or honeycomb catalytic converters that are used on automobile mufflers.

Porous rotor 185 may comprise or contain sintered metal. The rotor may be made of or may contain a permeable material. The permeable material may be tailored for a desired pore size and porosity having integral strength to withstand a desired operational rotation. In applications, the rotor comprises carbon fiber.

As mentioned hereinabove, rotor 185 may be porous and may comprise or contain sintered metal. The rotor may be made of or may contain a permeable material. The permeable material may be tailored for a desired pore size and porosity having integral strength to withstand a desired operational rotation. In embodiments, a porous rotor 185 comprises a permeable material 187 is sandwiched between an outer support 186 and an inner support 188. For example outer wall 186 and inner wall 188 of porous rotor 185 may be a support material. By positioning the porous material of rotor 185 between supports, increased strength may be provided thereto Inner and outer supports 186 and 188 may resemble a basket of support material in which the porous material is sandwiched. The inner and outer supports may be configured as a mesh basket (e.g., a stainless steel mesh basket) in which the porous material is sandwiched. The inner and outer supports may be any material known to provide support and through which gas may readily pass. Top 189 and bottom 184 of rotor may be impermeable to gas, or may comprise porous material.

The at least one gas centrifuge of the disclosed system further comprises at least one feed inlet. System 100 of the embodiment of FIG. 1 comprises feed inlet 120. Feed inlet 120 is configured to introduce feed gas into the interior space 122 defined by porous rotor 185. One end 125 of feed inlet 120 is in fluid communication with interior space 122 of gas centrifuge 110. Outlet end 125 of feed inlet 120 is positioned proximal to axis of rotation 103. Outlet end 125 of feed inlet 120 is positioned between top 189 and bottom 184 of interior space 122. In embodiments, outlet end 125 of feed inlet 120 is positioned within a lower portion of interior space 122. In embodiments, outlet end 125 of feed inlet 120 is positioned at or near bottom 184 of interior space 122. In applications, outlet end 125 of feed inlet 120 is positioned within the upper portion of interior space 122. In embodiments, outlet end 125 of feed inlet 120 is positioned at or near top 189 of interior space 122. The other end of feed inlet 120 is configured for introduction of reactant feed gas therein. Feed gas line 115 is fluidly connected with the end of feed inlet 120 outside of interior space 122.

Each of the one or more gas centrifuges of the disclosed system further comprises at least two outlets configured for removing a light fraction and a heavy fraction respectively from the gas centrifuge. In the embodiment of FIG. 1, system 100 comprises light fraction or first outlet 140 and heavy fraction or second outlet 190.

Light fraction outlet 140 is in fluid communication with interior space 122. In embodiments, light fraction outlet 140 is one end of a porous tube 150. The porous tube may be stationary or rotating during operation of system 100. The walls of porous tube 150 extend the entire length of interior space 122. In applications, the walls of porous tube 150 comprise size-exclusion material as described hereinabove with respect to the porous component. In this manner, for example, the walls of porous tube 150 may be selectively-permeable to gas of a desired size. In embodiments, therefore, first outlet 140 comprises one end of a stationary sintered metal tube extending the entire length of porous rotor 185 along axis 103. The stationary sintered metal tube may be selectively-permeable to gas molecules having a size below a cutpoint size. For example, walls of porous tube 150 may be permeable to methane gas and impermeable to carbon dioxide. First or light fraction outlet 140 is in fluid communication with light gas outlet line 155.

The inner surface of casing 165 and the outer surface 186 of porous rotor 185 create an annular region 105 therebetween. One end 192 of heavy fraction outlet 190 is in fluid communication with annular region 105. End 192 of product outlet 190 may be vertically positioned anywhere within annular region 105, for example, towards the top, bottom, or center of annular region 105. In embodiments, end 192 of second outlet 190 is positioned towards the bottom of annular region 105. In embodiments, end 192 of product outlet 190 is positioned proximal the inner surface of casing 165. Alternatively, end 192 of product outlet 190 is positioned distal the inner surface of casing 165. Alternatively, end 192 of product outlet 190 is horizontally positioned substantially halfway between the inner surface of casing 165 and outer surface 186 of rotor 185. Heavy fraction outlet 190 is in fluid communication with heavy fraction outlet line 195.

In embodiments, inlet and/or outlet ends of feed inlet 120, first fraction outlet 140, and/or heavy fraction outlet 190 have a diameter of ½ inch, ¾ inch, or 1-inch.

The gas centrifuge further comprises a motor coupled to the porous rotor. The motor is capable of providing rotation of the porous rotor about an axis of rotation. Rotation of the rotor applies reactive centrifugal force to the feed gas within the rotor. In the embodiment of FIG. 1, for example, motor 145 is coupled to porous rotor 185 and is capable of rotating porous rotor 185 about axis of rotation 103. Motor 145 may be coupled to porous rotor 185 such that porous rotor 185 is rotatable in a clockwise direction or in a counter-clockwise direction. The high speed motor may be capable of rotational frequencies of up to 90,000 RPM. Alternatively, some other means may provide the high rotational frequency. In embodiments, the high speed motor is capable of producing rotational frequencies of at least 5-, 7-, 7.5-, 10-, 15-, 20-, 25-, 30-, 40-, 50-, 60-, 70-, 80-, or 90-thousand revolutions per minute (RPM).

The gas separation system may further comprise one or more flow control valves and/or pumps to control flow thereto and therefrom. One or more pumps may be operable to provide vacuum and/or pressure assist to enhance flow through gas centrifuge 110. For example, in the embodiment of FIG. 1 gas separation system 100 comprises three pumps, 130A, 130B, and 130C. Feed pump 130A is positioned on feed inlet line 115 and may serve to force feed gas into gas centrifuge 110 under pressure. First outlet pump 130B is positioned on product outlet line 155 and is operable to control (assist or minimize) flow of gas via first outlet 140. For example, first outlet pump 130B may serve to provide vacuum removal of a light gas fraction from interior space 122. Second outlet pump 130C is positioned on second outlet line 195 and is operable to control (assist or minimize) flow of gas via second outlet 190. Alternatively or additionally, one or more flow control valves may be positioned on feed line 115, first outlet line 155, and second outlet line 195 respectively, and may be used to control flow therethrough.

System 100 may be in electronic communication with a control system, including a computer and sensors whereby flow of gas into and out of feed inlet 120, first outlet 140, and/or second outlet 190 and/or composition of gas within interior space 122 may be monitored and/or controlled.

Heaters. It is envisaged that, for certain applications, all or portions of gas centrifuge 110 may be heated to enhance separation of gaseous components. For example, all or portions of outer casing 165 may be heated using apparatus and methods as known in the art. In such applications, second outlet 190 may be desirably positioned within a lower portion of annular space 105 and outlet end 125 of feed inlet 120 may be positioned at or near bottom 184 of interior space 105, and/or an outlet end of first outlet 140 may be positioned at or near top 189 of interior space 122.

Two or more gas centrifuges may be configured in series and/or parallel. In embodiments, a first outlet line 155 of a first gas centrifuge is fluidly connected with a feed gas line 115 of a second gas centrifuge. The first gas centrifuge is operable to produce a light gas fraction comprising gas molecules below a first cutpoint size and a second gas centrifuge is operable to produce a second light gas fraction comprising gas components below a second cutpoint size which is greater than the first cutpoint size. In embodiments, a second outlet line 195 of a first gas centrifuge is fluidly connected with a feed inlet line 115 of a second gas centrifuge. In this embodiment, the first gas centrifuge is operable to produce a heavy gas fraction comprising gas molecules above a first cutpoint size and a second gas centrifuge is operable to produce a second heavy gas fraction comprising gas components above a second cutpoint size which is greater than the first cutpoint size. In this manner, a feed gas may be fractionated into three or more gas fractions having different average molecular weights.

Outer casing 165 provides an enclosed vessel. Thus, the temperature and pressure within gas centrifuge 110 is adjustable as desired within design limitations. Without limitation, gas centrifuge 110 may be operable at pressures up to at least 15 psig, 500 psig, 1000 psig, or 1455 psig. Gas centrifuge 110 may be operable, without limitation, to temperatures up to 150° C., 200° C., 250° C., 300° C., 400° C., 450° C., 500° C., 550° C., or up to about 600° C.

III. Method of Gas Separation. A method of separating light and heavy fractions of a gas according to this disclosure will now be made with reference to FIG. 1. A gaseous feed is introduced via feed line 115 and feed inlet 120 into gas centrifuge 110. The feed gas is introduced via inlet 120 into interior space 122 contained within the walls of rotor 185. In embodiments, the feed gas is introduced at or near the top of interior space 122. In embodiments, the feed gas is introduced at or near the bottom of interior space 122. The feed gas is introduced into interior region 122 proximal axis of rotation 103.

The feed gas is subjected to reactive centrifugal force by motor 145, which causes rotation of rotor 185 about axis of rotation 103. The rotor may be rotated at a rotational frequency of up to 5-, 7-, 7.5-, 10-, 15-, 20-, 25-, 30-, 40-, 50-, 60-, 70-, 80-, or 90-thousand RPM. Reactive centrifugal force pushes heavy molecular weight components of the gas feed toward inner walls 188 of rotor 185, while lower molecular weight components of the feed gas tend toward the center of interior space 122, toward axis of rotation 103. Low molecular weight gas is extracted via first outlet 140 and first outlet line 155. High molecular weight gas is extracted via second outlet 190 and second outlet line 195. Vacuum and/or pressure assist may be provided by first outlet pump 130B and/or second outlet pump 130C to enhance extraction of light gas fraction via first outlet 140 and first outlet line 155 and/or heavy gas fraction via second outlet 190 and second gas outlet line 195. In applications, feed gas is introduced and light gas extracted while the composition of gas within interior space 122 is monitored or calculated based upon the composition of light gas extracted. Once the composition with interior space 122 reaches a desired concentration of heavy gas fraction, heavy gas may be extracted via second outlet 190 and second gas outlet line 195.

As discussed hereinabove, in applications, first outlet 140 is one end of or is in fluid communication with a porous sintered metal tube 150. Porous tube 150 may be made from a selectively-permeable through which only molecules below a desired cutpoint size may pass. In embodiments, feed gas is introduced into interior space 122 and vacuum is provided by first outlet pump 130B to assist in extraction of lower molecular weight gas components via first outlet 140. Pressure may be applied to annular region 105 via second outlet pump 130C or a suitable valve closed to prevent removal of gas through annular region 105. Light gas is withdrawn from first outlet 140. When the concentration of heavy gas components in interior space 122 exceeds a desired value, introduction of feed is discontinued, extraction of low molecular weight gas completed, and pump 130C operated and/or a suitable valve opened to provide extraction of heavy gas components through porous rotor 185 and out via annular region 105.

Thus, vacuum and/or pressure assist may be used according to the disclosed method, to extract desired components from gas centrifuge 110.

As gas centrifuge 110 is a closed vessel, surrounded by outer casing 165, the operating temperature and pressure may be selected based on desired performance. In applications, the operating temperature may be in the range of from about 25° C. to about 600° C. In applications, the operating temperature is in the range of from about 100° C. or 150° C. to about 300° C., 400° C., or 500° C. In embodiments, gas separation/fractionation is performed at room temperature. In embodiments, gas separation/fractionation is performed at a temperature within the range of 5° C. to 45° C. In embodiments, gas separation/fractionation is performed at a temperature within the range of 20° C. to 40° C. In embodiments, gas separation/fractionation is performed at a temperature within the range of 25° C. to 35° C. The operational pressure may be a desired pressure within the limits of the design materials. Utilization of high temperatures may allow gas phase separation of feeds which are not gaseous at room temperature.

The gas centrifugation process utilizes a design that provides for gas to constantly flow in and out of gas centrifuge in certain applications. Unlike most centrifuges which rely on batch processing, the disclosed gas centrifuge permits continuous or semi-continuous processing. In such applications, gas may be continuously or semi-continuously extracted from interior space 122 and/or annular region 105 via first outlet line 155 and second outlet line 195 respectively.

Serial Operation. In embodiments of the gas separation method, product gas from a first gas centrifuge is introduced directly into a second gas centrifuge as feed gas thereto. A first gas centrifuge may be operated to remove a first heavy component from a feed gas, a second gas centrifuge operated to remove a second heavy component from the feed gas, etc. In this manner, a feed gas may be fractionated into three or more components or fractions.

Alternate Design: In an embodiment, a non-porous rotor is combined with a porous size-exclusion tube 150. Centrifugation will cause high molecular weight molecules to tend toward the inner walls 188 of the non-porous rotor 185 and low molecular weight gas molecules to tend toward the center of interior space 122 coincident axis of rotation 103. Once a concentration of heavy molecular weight gas within interior space 122 exceeds a desired level, introduction of feed may be discontinued and heavy gas may be removed from interior space 122. The concentration of heavy gas in interior space 122 may be determined directly or by calculation of the difference between the inlet gas fed and the light gas removed via first outlet 140 and first gas outlet line 155. A second outlet may be provided to extract heavy gas from within interior space 122. Such a second outlet may extend into interior space 122 symmetrically about axis of rotation 103 and, once within interior space 122, may extend to a position proximal inner wall 188 of rotor 185.

EXAMPLES

Example 1

In a specific embodiment, the feed gas continuously introduced into the gas centrifuge comprises dirty methane gas containing carbon dioxide and other gaseous impurities having a molecular weight greater than that of methane. In such instances, methane may be removed from interior space 122 via first outlet 140, while a heavy fraction comprising carbon dioxide and other heavy components is removed from annular region 105. A size-exclusion outlet tube 150 having walls having a pore size inclusive of methane and exclusive of carbon dioxide and other large molecules may be used to enhance the separation. Vacuum 130B may be used to assist in withdrawal of methane from the center of interior space 122. Pressure may be applied to annular space 105 to prevent removal of gas through rotor 185 and annular region 105 until a desired concentration of large molecular weight components, including carbon dioxide, remains within interior space 122. At this time, introduction of feed gas may be discontinued. Vacuum 130B may be continued for a time to remove final amounts of low molecular components from interior space 122. Then, vacuum 130B may be discontinued, and pump 130C utilized to extract high molecular weight material through porous rotor 185 and annular region 105. The light weight fraction may be introduced into a subsequent gas centrifuge and a light component or fraction comprising methane may be separated from a second heavy fraction comprising, for example, nitrogen.

In embodiments, this separation of carbon dioxide from methane gas is performed at ambient temperature. In embodiments, this separation of carbon dioxide from methane gas is performed at a temperature within the range of 5° C. to 45° C. In embodiments, the separation of carbon dioxide from methane gas is performed at a temperature within the range of 20° C. to 40° C.

In embodiments, the separation of carbon dioxide from methane gas is performed at a temperature within the range of 25° C. to 35° C. In this manner, pipeline-grade methane may be produced in the absence of cooling and/or in the absence of amine systems.

Example 2

In an application, first outlet 140 is one end of or is fluidly connected with a porous tube 150 designed with a first cutpoint size. Gas component 1 has a molecular weight below the cutpoint size, while gas components 2 and 3 have sizes above the cutpoint size. In this embodiment, light gas fraction comprising gas component 1 may be removed from interior space 122 via first gas outlet 140. Heavy gas comprising excluded components 2 and 3 may be extracted from the gas centrifuge via second gas outlet 190. Heavy gas comprising excluded components 2 and 3 may be subsequently introduced as feed gas into a second gas centrifuge comprising a first outlet 140 comprising a sintered metal tube designed with a second cutpoint size greater than the first cutpoint size. In this manner, gas component 2 may be removed via first outlet 140 and thusly separated from gas component 3, which may be extracted through porous rotor 185 and annular region 105. Vacuum and/or pressure assist may be utilized to enhance separation.

Example 3

In a specific embodiment, the disclosed system and method are utilized to enrich uranium. In such applications, the feed gas continuously introduced into the size-exclusion gas centrifuge comprises gaseous uranium hexafluoride containing uranium-235 and uranium-238. In such instances, light gas component uranium-235 is removed via first outlet 140 and heavy component uranium-238 is extracted via second outlet 190.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:
1. An apparatus comprising:
   a cylindrical rotor positioned about an axis of rotation, and fully enclosing an interior space, wherein the cylindrical rotor comprises a porous cylinder having a top and a bottom thereon, and wherein the porous cylinder comprises sintered metal or ceramic;
   an outer casing surrounding the cylindrical rotor, wherein the outer casing and the cylindrical rotor are separated by an annular space;

a vertical feed inlet tube centered within the cylindrical rotor proximal the axis of rotation, extending a distance into the cylindrical rotor from the top thereof, and having a feed outlet end positioned between the top and the bottom of the cylindrical rotor, whereby feed is introduced into the interior space;

a stationary porous tube disposed within the cylindrical rotor, wherein a portion of the stationary porous tube is disposed within the vertical feed inlet tube;

a first outlet coupled to an end of the stationary porous tube;

a second outlet coupled to the outer casing; and a motor configured for rotating the cylindrical rotor about the axis of rotation.

2. The apparatus of claim 1, wherein the porous cylinder is selectively-permeable.

3. The apparatus of claim 1, wherein the feed inlet tube extends into a lower portion of the interior space.

4. The apparatus of claim 1, wherein the cylindrical rotor has a diameter in the range of from about 4 to about 12 inches.

5. The apparatus of claim 4, wherein the cylindrical rotor has a length in the range of from about 8 to about 20 inches.

6. The apparatus of claim 1, wherein the motor is configured to operate with a rotational frequency of the porous rotor of up to at least about 7,500 RPM.

7. An apparatus comprising:

a cylindrical rotor symmetrically positioned about an axis of rotation, and fully enclosing an interior space, wherein the cylindrical rotor comprises a cylinder having a top and a bottom thereon;

an outer casing surrounding the cylindrical rotor, wherein the outer casing and the rotor are separated by an annular space;

a motor configured for rotating the rotor about the axis of rotation;

a vertical feed inlet tube centered within the cylindrical rotor proximal the axis of rotation, extending a distance into the cylindrical rotor from the top thereof, and having a feed outlet end positioned between the top and the bottom of the cylindrical rotor, whereby feed is introduced into the interior space;

a stationary porous tube disposed within the cylindrical rotor, wherein a portion of the stationary porous tube is disposed within the vertical feed inlet tube; and, an outlet coupled to an end of the stationary porous tube.

8. The apparatus of claim 7, wherein the vertical feed inlet tube extends into an upper portion of the interior space.

9. The apparatus of claim 7, wherein the cylinder is a porous cylinder made from or comprising a selectively-permeable metal or ceramic material.

10. The apparatus of claim 7, wherein the cylindrical rotor has a diameter in the range of from about 4 to about 12 inches.

11. The apparatus of claim 10, wherein the cylindrical rotor has a length in the range of from about 8 to about 20 inches.

12. The apparatus of claim 7, wherein the motor is configured to operate with a rotational frequency of the cylindrical rotor of up to at least about 7,500 RPM.

13. An apparatus comprising:

a cylindrical rotor positioned about an axis of rotation, and fully enclosing an interior space, wherein the cylindrical rotor comprises a porous cylinder having a top and a bottom thereon, and wherein the porous cylinder comprises sintered metal or ceramic, and wherein the porous cylinder is selectively-permeable;

an outer casing surrounding the cylindrical rotor, wherein the outer casing and the cylindrical rotor are separated by an annular space;

a stationary porous tube disposed within the cylindrical rotor;

a vertical feed inlet tube extending a distance into the cylindrical rotor and disposed around a portion of the stationary porous tube;

a first outlet coupled to an end of the stationary porous tube; and a second outlet coupled to the outer casing.

14. The apparatus of claim 13, wherein the cylindrical rotor has a diameter in the range of from about 4 to about 12 inches, and a length in the range of from about 8 to about 20 inches.

15. The apparatus of claim 7 further comprising an outlet coupled to the outer casing.

\* \* \* \* \*